(12) United States Patent
Kryzer (10) Patent No.: US 9,639,342 B2
(45) Date of Patent: May 2, 2017

(54) UNOBTRUSIVE FIRMWARE UPDATES FOR HEARING ASSISTANCE DEVICES

(71) Applicant: Starkey Laboratories, Inc., Eden Prairie, MN (US)

(72) Inventor: Jeff Patrick Kryzer, Maple Grove, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 434 days.

(21) Appl. No.: 14/019,012

(22) Filed: Sep. 5, 2013

(65) Prior Publication Data

US 2014/0331218 A1    Nov. 6, 2014

Related U.S. Application Data

(60) Provisional application No. 61/818,357, filed on May 1, 2013.

(51) Int. Cl.
*G06F 9/445* (2006.01)

(52) U.S. Cl.
CPC .............. *G06F 8/65* (2013.01); *G06F 8/60* (2013.01); *G06F 8/61* (2013.01)

(58) Field of Classification Search
None
See application file for complete search history.

(56) References Cited

U.S. PATENT DOCUMENTS

| | | |
|---|---|---|
| 7,903,827 B1 | 3/2011 | Lockwood |
| 8,230,415 B1 * | 7/2012 | Thomas ................ 717/173 |
| 9,262,145 B2 * | 2/2016 | Grimme .................. G06F 8/60 |
| 2002/0054689 A1 * | 5/2002 | Zhang et al. .............. 381/312 |
| 2003/0110482 A1 * | 6/2003 | Ferguson et al. ........... 717/168 |

(Continued)

FOREIGN PATENT DOCUMENTS

| | | |
|---|---|---|
| EP | 2327015 A2 | 6/2011 |
| EP | 1252799 B1 | 10/2011 |
| WO | WO-0235884 A2 | 5/2002 |

OTHER PUBLICATIONS

Wikipedia, "SMS," 2010, downloaded from the Internet on Jun. 29, 2015 from <url>:http://web.archive.org/web/20100411043807/http://en.wikipedia.org/wiki/Short_message_service, pp. 1-9.*

(Continued)

*Primary Examiner* — Thuy Dao
*Assistant Examiner* — Stephen Berman
(74) *Attorney, Agent, or Firm* — Schwegman, Lundberg & Woessner, P.A.

(57) ABSTRACT

The present disclosure includes some examples of methods, systems, and machine readable media which deliver firmware updates to a computing device of a hearing professional while requiring little or no user interaction. For example, the firmware patches may be delivered in a way that does not require administrator access on the computer. In various embodiments, the updates may only require periodic access to a network (e.g., the Internet), the updates may not require the fitting software to be running, and/or the updates may not even require a user to be logged in to the computing device.

24 Claims, 5 Drawing Sheets

(56) References Cited

U.S. PATENT DOCUMENTS

| | | | | |
|---|---|---|---|---|
| 2005/0283263 | A1 | 12/2005 | Eaton et al. | |
| 2007/0169093 | A1* | 7/2007 | Logan | G06F 8/60 717/168 |
| 2008/0052702 | A1* | 2/2008 | Chuang | G06F 8/65 717/170 |
| 2010/0037216 | A1* | 2/2010 | Carcerano | G06F 8/65 717/173 |
| 2010/0169876 | A1 | 7/2010 | Mann | |
| 2010/0175062 | A1* | 7/2010 | Kim | G06F 8/65 717/173 |
| 2010/0281474 | A1* | 11/2010 | Eason | G06F 8/61 717/172 |
| 2011/0188684 | A1 | 8/2011 | Spieler et al. | |
| 2012/0317649 | A1* | 12/2012 | Partee | G06F 8/65 726/26 |
| 2013/0185709 | A1* | 7/2013 | Haubold | G06F 9/445 717/170 |
| 2015/0169313 | A1* | 6/2015 | Katsura | G06F 11/00 717/170 |

OTHER PUBLICATIONS

Wikipedia, "Wi-Fi," 2011, downloaded from the Internet on Jun. 29, 2015 from <url>:http://web.archive.org/web/20110804020253/http://en.wikipedia.org/wiki/Wi-Fi, pp. 1-12.*

Nilsson et al., "Secure Firmware Updates over the Air in Intelligent Vehicles," 2008, IEEE International Conference on Communications Workshops, pp. 380-384.*

OMA, "Firmware Update Management Object," 2006, pp. 1-32, downloaded from the Internet at <url>:http://citeseerx.ist.psu.edu/viewdoc/download?doi=10.1.1.465.2978&rep=rep1&type=pdf on Dec. 20, 2016.*

Petridou et al., "Automated firmware updating in large scale heterogeneous systems," 2011, pp. 1-18, downloaded from the Internet at <url>: https://www.os3.nl/_media/2010-2011/courses/lia/eleonora_jochem_report.pdf on Dec. 20, 2016.*

"European Application Serial No. 14166699.0, Extended European Search Report mailed Oct. 31, 2014", 6 pgs.

* cited by examiner

UNOBTRUSIVE FIRMWARE UPDATES FOR HEARING ASSISTANCE DEVICES

CLAIM OF PRIORITY

This patent application claims the benefit of priority, under 35 U.S.C. Section 119(e) to U.S. Provisional Patent Application Ser. No. 61/818,357, entitled "Unobtrusive Firmware Updates for Hearing Assistance Devices," filed on May 1, 2013, which is hereby incorporated by reference herein in its entirety.

BACKGROUND

Modern hearing assistance devices (for example, hearing aids) contain operating instructions called firmware which provide instructions for signal processing and may further specify certain operations that the hearing assistance devices are to perform. In some instances, these instructions may contain defects which cause undesired operation. Corrected versions of the firmware are distributed to provide good code that will remove the defects. In some cases the operating firmware is free of defects, but firmware upgrades are developed that provide additional features. Without a system for providing updates, the latest firmware may not be upgraded timely.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Hearing assistance devices use firmware to configure the hardware of the hearing assistance device to perform the functions of the hearing assistance device. For example, the firmware may instruct the hardware to take an input sound signal from a microphone in the hearing assistance device and process it according to instructions in the firmware and finally to output the processed signal to a speaker, transducer, or the like.

Firmware on a hearing assistance device can be updated using fitting software. Fitting software is an application which runs on a computing system and are typically utilized by an audiologist that is used to set various parameters of the hearing assistance devices in order to customize the device to the wearer's needs. Examples include adjusting the amplification levels for particular frequencies, setting up accessories to work properly with the hearing assistance devices, and the like. Sometimes a firmware version is bundled with a fitting software release. In order to update to a new version of firmware, a new version of the fitting software is required. Unfortunately, the software development cycle of the fitting software is typically very long and does not allow for fast updates. Thus a code error in the firmware may not be immediately fixed as an update to the fitting software incorporating the updated firmware may not be released for several more months. Additionally, the fitting software is typically a large application that is not ideal for delivery over a network as it may take a large amount of time and consume an inordinate amount of computer resources. Furthermore, updating the fitting software is likely to require administrator access on the client computing device, creating further burdens.

The present disclosure includes some examples of methods, systems, and machine readable media which deliver firmware updates to a computing device of a hearing professional while requiring little or no user interaction. For example, the firmware patches may be delivered in a way that does not require administrator access on the computer (e.g., most software programs require elevated administrator privileges to install on Microsoft Windows VISTA™ or later releases, which may require user confirmation). In various embodiments, the updates may only require periodic access to a network (e.g., the Internet), the updates may not require the fitting software to be running, and/or the updates may not even require a user to be logged in to the computing device.

In some examples, a firmware update module may be installed on a computing device of a hearing professional such as an audiologist. In some examples, this firmware update module may run as a service of the operating system. The firmware update module may contact, over a network, a firmware update service (e.g., contact over the Internet a web-based service) to check for new firmware updates. The firmware update module may receive the latest firmware version number from the firmware update service and compare it to the firmware version number of the last firmware downloaded to determine if an update is available. If an update is available, the update module may download the newer version of the firmware. In some examples the firmware update module may replace the old version with the new version in a predefined location in storage. The fitting software may be programmed to look for a firmware object in the predefined location. Thus, replacing the file stored in the predefined location may cause the fitting software to load the new version of the firmware to connected hearing assistance devices. Once the new firmware is downloaded, the computing device does not need to be connected to the network (e.g., the Internet) in order to upload the firmware to the hearing assistance devices. In other examples, the firmware update module may simply store the new version in the same location with the old version and the fitting software may offer the hearing professional the choice of which firmware to load onto the hearing device from several versions. For example, different firmware versions may be created that are tailored for a particular individual, a particular hearing loss condition or type, a particular lifestyle of the wearer (e.g., active individuals vs. non-active individuals, individuals who frequent noisy environments vs. quiet environments), or the like. In some examples the firmware update module may notify the hearing professional of the available updated firmware, in other examples the firmware update module may be silent and not notify the hearing professional. The update module may also handle updates to the firmware for various different hearing assistance devices.

In other examples, the firmware update module could be a regular application, a utility application that comes with the fitting software, a system tray application, or be part of the fitting software itself. The update module may be distributed with the fitting software, or may be separately distributed. In some examples, the firmware update module may be invisible to the user, in other examples, it may contain a user interface.

To avoid requiring elevated administrator access, the firmware files may be stored in a location on local storage (e.g., the harddrive) of the computing device. The operating system may allow updates to occur to these locations without elevated permissions. In other examples, the firmware update module may prompt the user to ask for elevated administrator privileges. In these examples, the firmware update module may place the firmware updates in any location.

In some examples, the firmware update module may check for updates at regular intervals. In other examples, the firmware update module may check for updates from the firmware update service upon connection of a hearing instrument with the fitting software on the computing device. For example, once connected to the hearing assistance device, the fitting software may check the firmware version of the firmware object in local storage, the firmware version on the hearing assistance device, or both. It may then contact the firmware update service in order to ascertain the latest firmware version. If the firmware version stored in either the local storage of the computing device or on the hearing assistance device is out-of-date, the update module may cause the computing device to download the newest version of the firmware from the firmware update service and store it in local storage, update the hearing instrument's firmware, or both.

In yet other examples, the firmware update module may register with the firmware update service in order to receive updates when new firmware is available. When a new firmware version is available the firmware update service may send a message to the firmware update module which may then download the new firmware. In some examples, the fitting module may store the firmware versions of customers of the hearing professional and then display the list of customers that have older versions of the firmware and a hearing professional may contact them so they can have their firmware updated. In some examples, the system may store end-user customer's contact information, such as an email address, text message number, and/or phone number, along with their last installed firmware version. Upon receiving an update, the system may automatically contact them and urge them to come in to have their firmware updated. For example, the system may automatically send them an email informing them of the new update. In other examples the system may automatically call them with an automated phone dialer and an automated message.

In other examples, the update module may receive firmware updates instead of, or in addition to, the firmware update service from removable media (e.g., Compact Disk, Universal Serial Bus (USB), another storage location, or the like), another computer which it is networked to (either wired or wirelessly) the computing device, a mobile device (wired or wirelessly), or any other piece of hardware which is capable of transporting the bytes of the new hearing aid firmware.

While the above description referenced hearing assistance device firmware, one of ordinary skill in the art with the benefit of Applicant's disclosure will appreciate that other firmware, and other software, may be updated using the methods, systems, and machine readable mediums described herein. For example, hearing assistance device accessories may have firmware that may be updated similarly. In general, the methods, systems, and machine readable mediums described herein may be applicable to update modules running on computer systems that maintain, update, and modify firmware on external devices and accessories which are external from the computer system on which the update module is running. The update module may connect with the external device through a variety of wired and wireless means (e.g., Bluetooth, Universal Serial Bus, and the like). While in many examples herein, the firmware update module may update the firmware on the computing device, which is then uploaded to the hearing assistance devices via the fitting software, in other examples, the update module may contain functionality to update the hearing assistance devices. For example, the firmware update module may be a separate application which is used by the audiologist to update the firmware. In yet other examples, the firmware updates may be made available to wearers of the hearing assistance devices for home updates and home customizations. For example, different firmware versions may be made available to wearers that may be customized to their needs for home application using a wearer's home computer.

Figure 1:
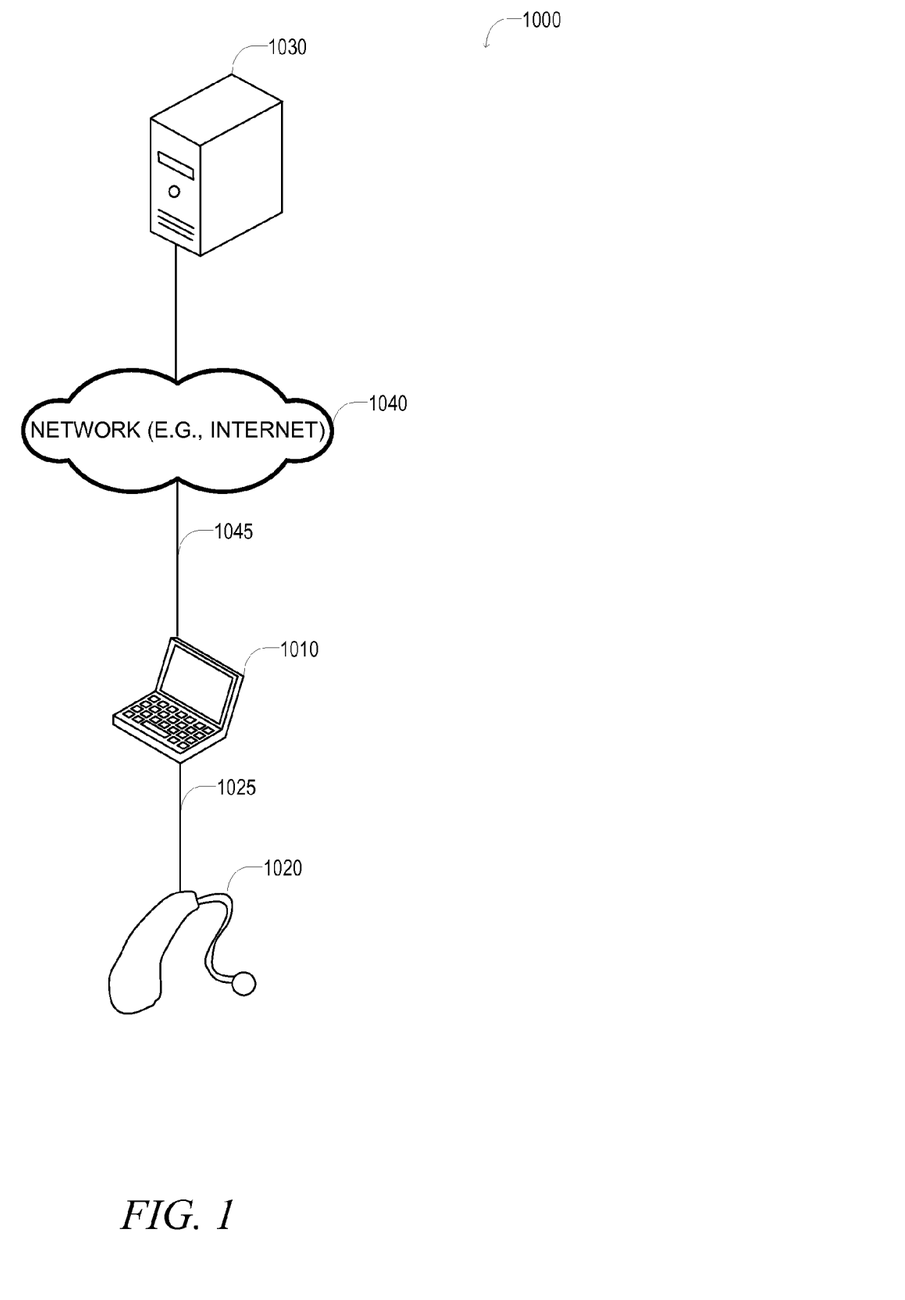
FIG. 1 shows an unobtrusive firmware update system according to some examples of the present disclosure.

FIG. 1 shows one example unobtrusive firmware update system 1000 according to some examples of the present disclosure. Hearing assistance device, such as hearing aid 1020 may be connected with a computing device 1010 over communication link 1025. Communication link 1025 may wired or wireless. Communication link 1025 may be or include one or more of an Ethernet connection, a modem connection, a cellular connection (e.g., based upon a $3^{rd}$ generation wireless standard such as Universal Mobile Telecommunications System (UMTS), a $4^{th}$ generation wireless standard such as a Long Term Evolution (LTE) standard, or the like), a Wireless LAN (WLAN) connection (e.g., such as a WLAN based upon an Institute for Electrical and Electronics Engineers (IEEE) 802.11 family of standards), a Bluetooth connection, a ZigBee connection, a Shockburst wireless link as defined by Nordic Semiconductor of Norway, or the like.

Computing device 1010 may execute software, such as fitting software, which may contain operating instructions which may allow the fitting software to download firmware to the hearing assistance device 1020, customize the hearing assistance device 1020 for a wearer, or otherwise program the device through communications link 1025. Computing device 1010 may be any device that can communicate with hearing assistance device 1020 and which may execute the update module. Example computing devices include a laptop computer, a desktop computer, a tablet computer, a mobile device (e.g., a smartphone, cellular phone, personal digital assistant (PDA)), or the like. In addition, computing device 1010 may be connected over a network 1040 to firmware update service 1030. Computing device 1010 may be connected to network 1040 using a communication link 1045. Communication link 1045 may wired or wireless. Communication link 1045 may be or include one or more of an Ethernet connection, a modem connection, a cellular connection (e.g., based upon a $3^{rd}$ generation wireless standard such as Universal Mobile Telecommunications System (UMTS), a $4^{th}$ generation wireless standard such as a Long Term Evolution (LTE) standard, or the like), a Wireless LAN (WLAN) connection (e.g., such as a WLAN based upon an Institute for Electrical and Electronics Engineers (IEEE) 802.11 family of standards), a Bluetooth connection, a ZigBee connection, a Shockburst wireless link as defined by Nordic Semiconductor of Norway, or the like.

Firmware update service 1030 may be any computing device(s) which may communicate with one or more computing devices 1010 and which may respond to firmware version checks and firmware download requests from the one or more computing devices 1010. The computing device may contact the firmware update service 1030 over network 1040 to request the latest firmware version and to download a new firmware version if required. Firmware update service 1030 may contain or be in communication with a storage device for storing firmware objects.

Figure 2:
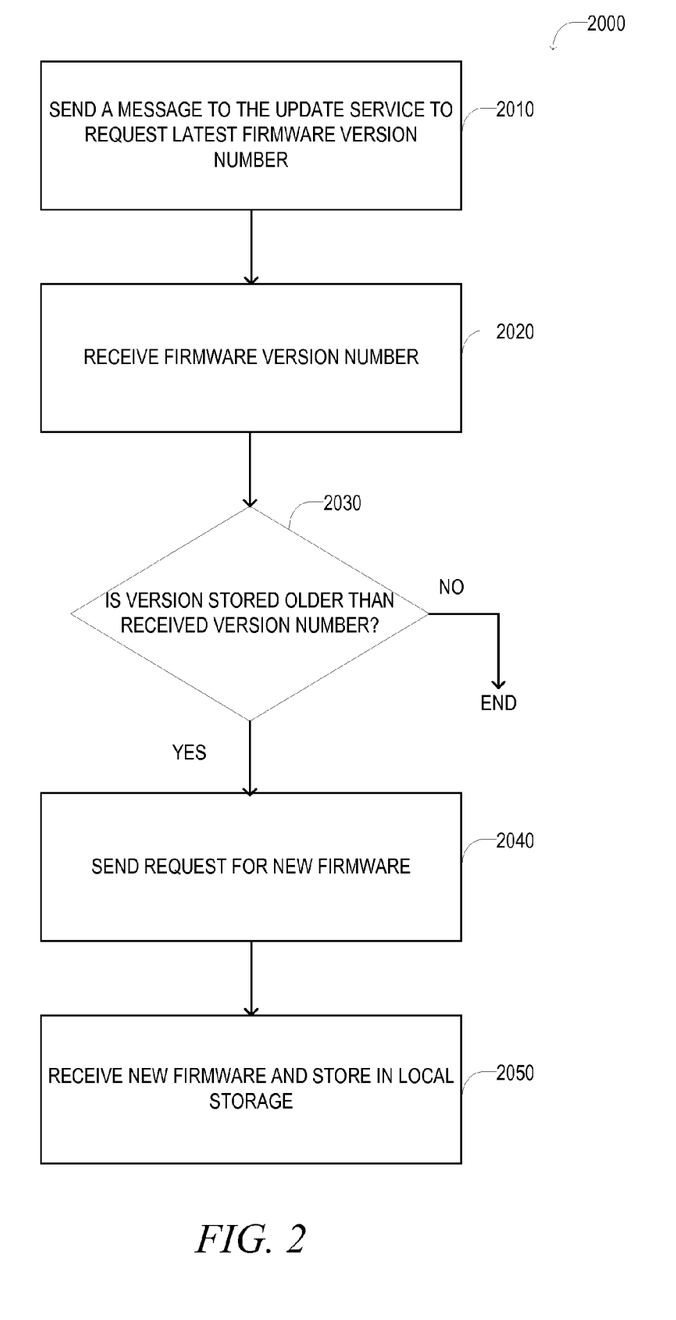
FIG. 2 shows a flowchart of a method of a firmware update module according to some examples of the present disclosure.

FIG. 2 shows an example method 2000 of a firmware update module according to some examples of the present disclosure. Upon occurrence of a firmware update trigger condition, the firmware update module may send a message to the firmware update service to request the latest firmware version number at operation 2010. Example firmware update trigger conditions may be one or more of: the passage of a predetermined amount of time since the last check (e.g., a number of days, weeks, months, and years), a message from the firmware update service that an update is available, connection of a hearing instrument, or the like. At operation 2020 the firmware update module may receive the firmware version number from the update service. At operation 2030 the firmware update module may compare the received firmware version with the version of firmware currently stored. If the firmware currently stored is the latest version, the firmware update module may end and go back to waiting until the next firmware update trigger condition is detected. If the firmware version stored indicates that the firmware stored locally has been updated, the firmware update module may send a request to the firmware update service for the new firmware at operation 2040. At operation 2050 the firmware update module may receive the new firmware and store it in local storage. In some examples, the local storage may be a location which may be read from and written-to without requiring elevated permission levels.

Figure 3:
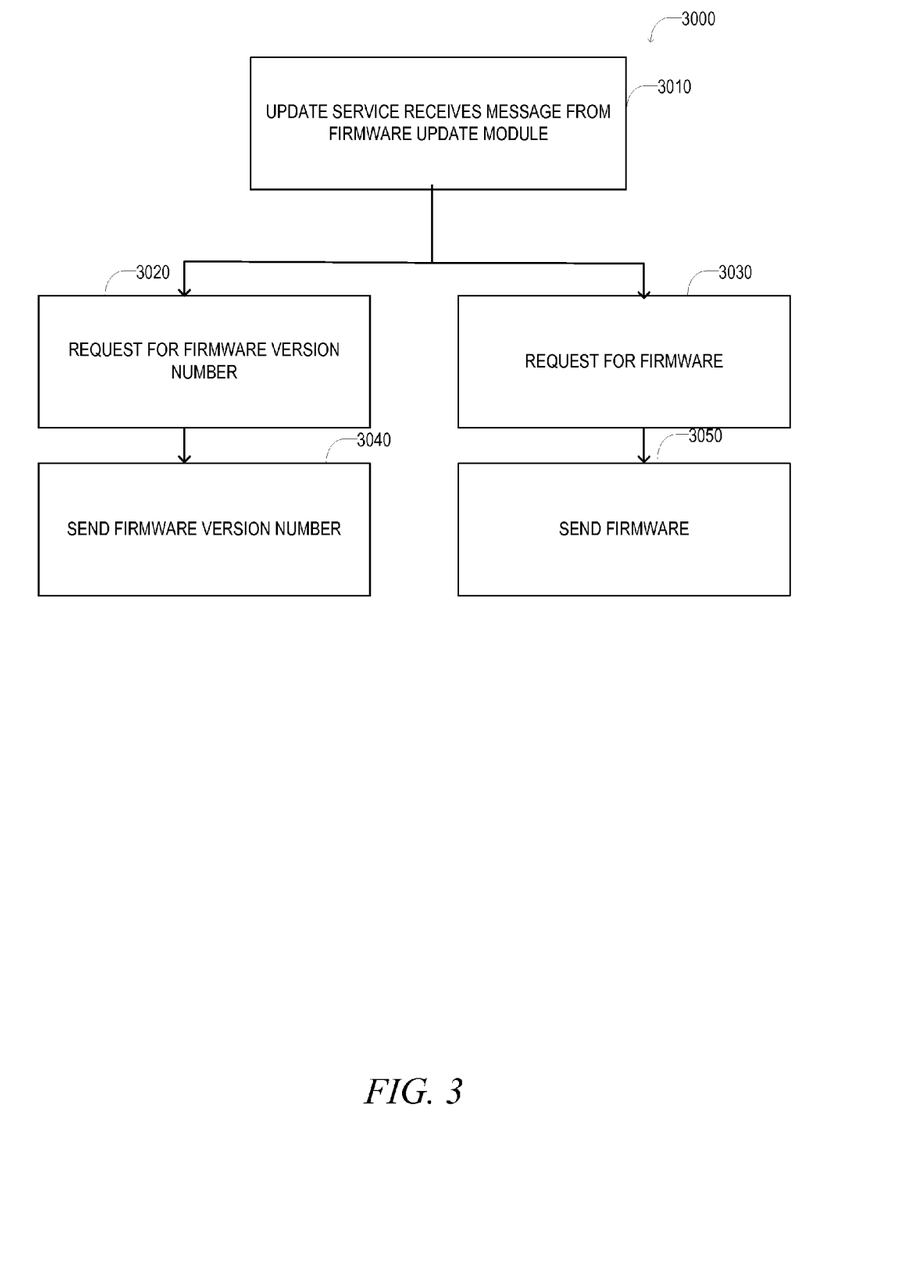
FIG. 3 shows a flowchart of a method of a firmware update service according to some examples of the present disclosure.

FIG. 3 shows an example method 3000 of a firmware update service according to some examples of the present disclosure. At operation 3010 the firmware update service receives a message from the firmware update module. If the request is for the firmware version number at operation 3020, the firmware update service may respond at operation 3040 with the firmware version number. If the request is for a firmware version at operation 3030, the firmware update service may respond at operation 3050 with the firmware file or files. In some examples the firmware update service may support multiple devices and the requests received from the computing devices may include an identifier of the device and the firmware update service may determine the firmware version appropriate for the particular device. In other examples, the computing device may send its current version and the firmware update service may simply respond with an indication of whether an update is available or not.

Figure 4:
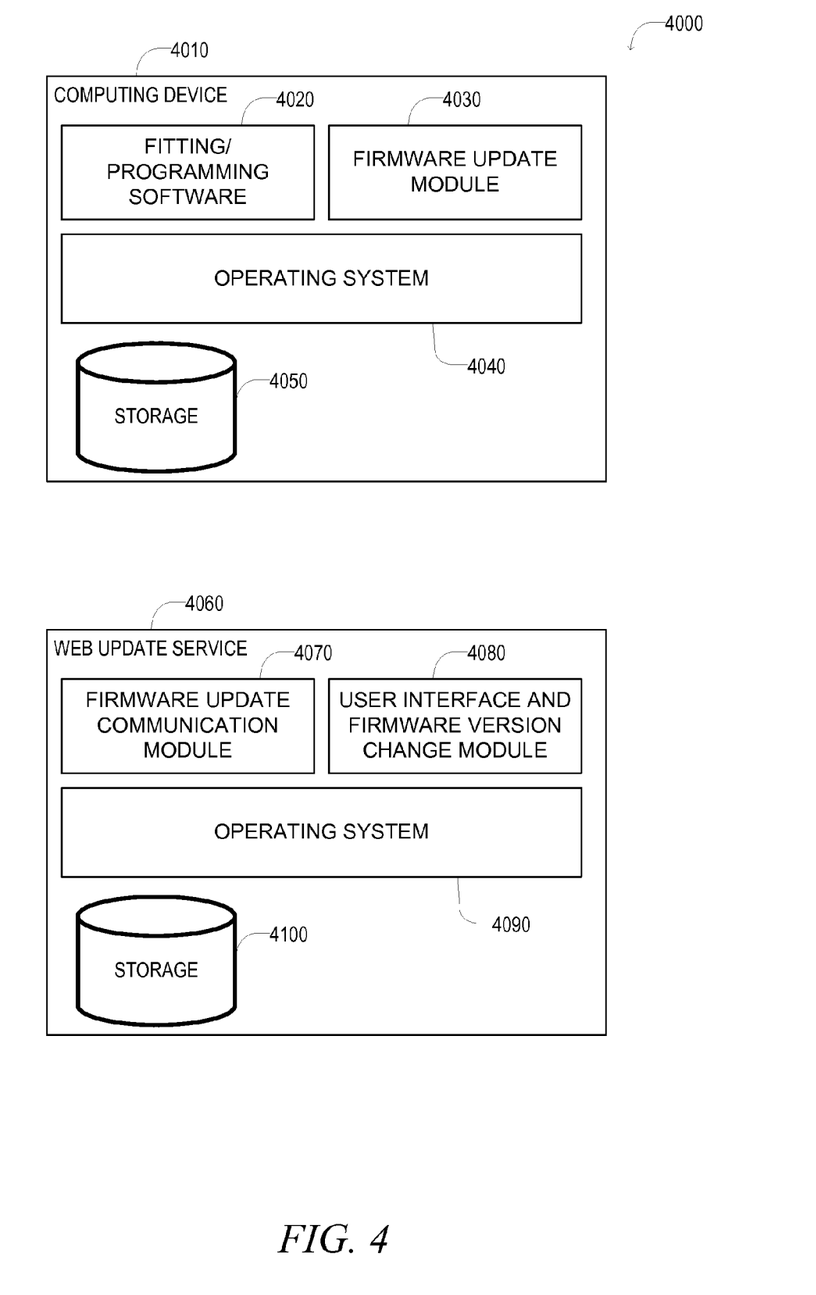
FIG. 4 shows a schematic of a computing device and a firmware update service according to some examples of the present disclosure.

FIG. 4 shows a schematic of a computing device 4010 and a firmware update service 4060 according to some examples of the present disclosure. Computing device 4010 includes fitting software module 4020. Fitting software module 4020 may communicate with one or more hearing assistance devices to upload firmware, change settings, customize the device to a user, collect data, activate or deactivate functions, or the like. Fitting software module 4020 may utilize a firmware object stored in a particular predefined location in storage 4050 to load or update firmware on hearing assistance devices. Upon detecting a triggering event, firmware update module 4030 may un-obtrusively check the firmware version of the object in storage 4050 and contact the firmware update service 4060 to check for updates. If an update is found, it may download the new firmware object and store it in place of the old object in the predefined location in storage 4050. The firmware update module may be a regular application, a service executing as part of the operating system 4040, a utility application, a system tray application, or may be part of the fitting software module 4020. Operating system 4040 may be any software which manages computer hardware resources and provides common services for computer programs. Storage 4050 may be any storage accessible by computing device 4010 and may be local storage, or may be remote storage. Examples include a hard drive, a Digital Video Disc (DVD) media, a Compact Disc (CD), a Universal Serial Bus (USB) thumbdrive, or the like.

Firmware update service 4060 may be any network accessible service which may provide firmware update services to one or more computing devices such as computing device 4010. Firmware update service 4060 may have a firmware update communication module 4070 which may communicate with the firmware update module 4030. For example, firmware update service 4060 may provide the most recent firmware version number to firmware update module 4030. Firmware update service 4060 may also provide the latest firmware objects/files to the firmware update module 4030. The firmware update communication module 4070 may utilize information in storage 4100 to determine the latest firmware version and the latest firmware objects. User interface and firmware version change module 4080 may allow an administrator to upload new firmware and indicate that the latest firmware has changed. This may be done locally—e.g., through a user interface, or remotely through a web-page or other remote access. Storage 4100 may store version information and firmware objects and may be local or may be remote. Examples include a hard drive, a Digital Video Disc (DVD) media, a Compact Disc (CD), a Universal Serial Bus (USB) thumbdrive, or the like. Operating system 4090 may be any software that manages computer hardware resources and provides common services for computer programs.

While FIG. 4 shows the firmware update module 4030 executing on the same computing device as the fitting software 4020 (e.g., in a hearing professional's office), in other examples, the firmware update module 4030 may execute on any number of computing devices as a stand-alone application. In these examples, the firmware update module 4030 may contain instructions which may allow the computing device it is executing on to query a hearing assistance device's firmware and determine if an upgrade is available independently of the fitting software. For example, in a patient's home.

In these examples, this independent update module may take one of several possible actions upon receipt of a notice that an update is available. In some examples, the independent module may simply notify the user to visit their hearing professional for the upgrade. This may be done visually through a display device, through electronic communications (e.g., text messages or emails to a user account associated with the device), or the like. In other examples the firmware update module may set an update bit in the memory of the hearing assistance device. In this case, upon connecting to the fitting software at a later time, the fitting software may read this bit and determine than an upgrade is necessary. The fitting software may then utilize an update module 4030 on the computing device of the fitting software to check for updates with the firmware update service and download those updates if available. The fitting software may then upgrade the firmware in the hearing assistance device. In yet other examples, the independent update module may contain instructions to download the updated firmware from the firmware update service and install it onto the hearing assistance device.

For example, firmware update modules configured as, or running on, Wi-Fi Access Points may connect with a hearing assistance device and may contain a firmware update module which may check for updates to the hearing instrument's firmware and notify the user if any updates are necessary, download the firmware to the hearing assistance device, or set the update bit in the hearing assistance devices. A network of these firmware update enabled access points may ensure that wearers of hearing assistance devices always have up to date firmware.

The firmware update modules as configured may communicate with the hearing assistance devices using one or more wired and wireless technologies. For example the firmware update modules may communicate with the hearing assistance device using sort range wireless technologies such as Bluetooth, Wireless Fidelity 802.11 (such as 802.11n), or the like; long range wireless technologies such as Global System for Mobile Telecommunications (GSM), Long Term Evolution (LTE), or the like. For example, the Wi-Fi access points utilizing the firmware update module may provide wireless internet access to the public or other individuals, but may also communicate with the hearing assistance devices over Wi-Fi, Bluetooth, or other wireless link. The firmware update modules may communicate with the firmware update services to maintain a current firmware version for each different supported hearing assistance device.

Figure 5:
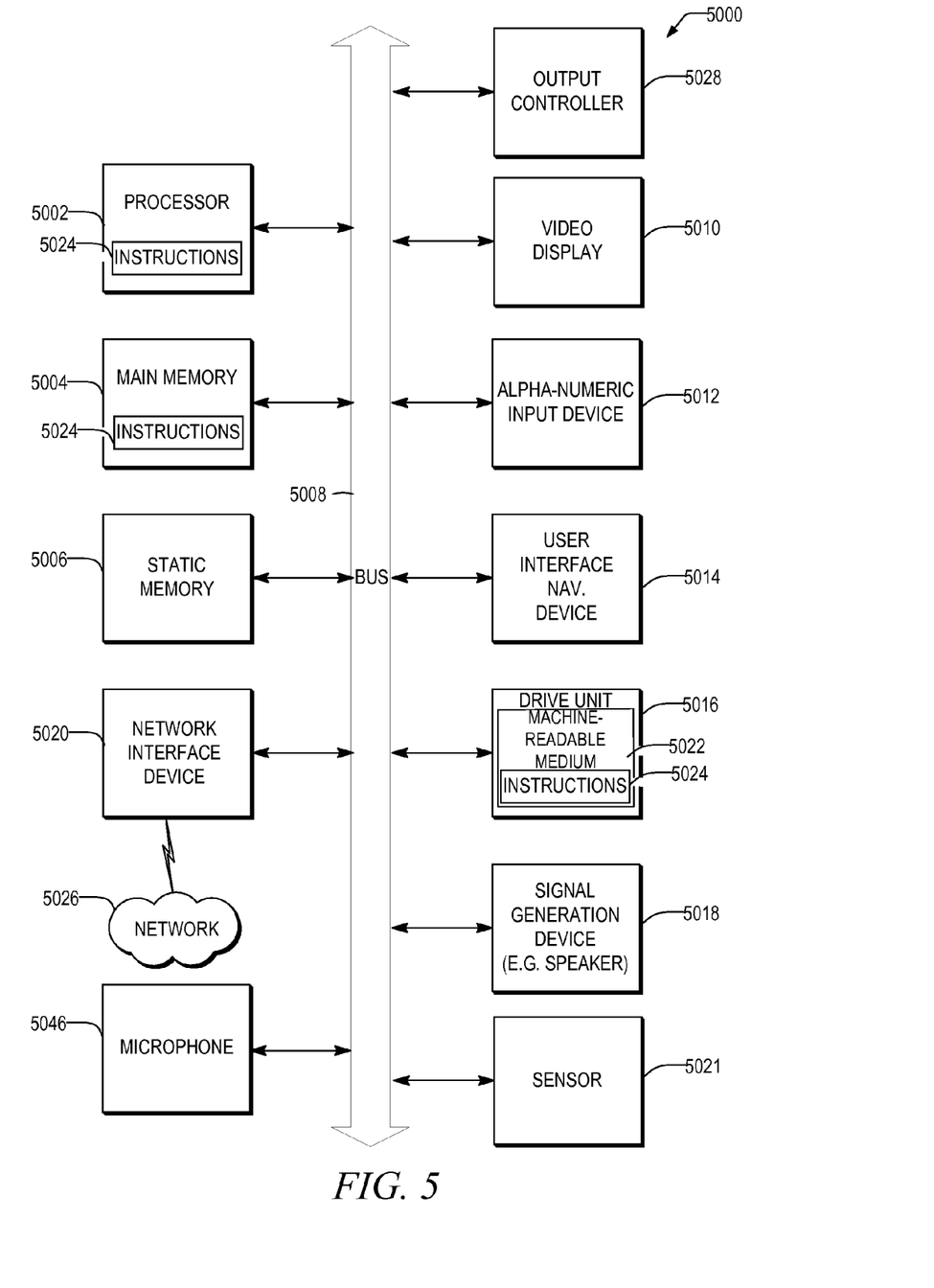
FIG. 5 shows a schematic of a machine according to some examples of the present disclosure.

FIG. 5 illustrates a block diagram of an example machine 5000 upon which any one or more of the techniques (e.g., methodologies) discussed herein may be performed. Any of the computing devices shown in FIGS. 1, and 4 may be or include portions of machine 5000. In alternative embodiments, the machine 5000 may operate as a standalone device or may be connected (e.g., networked) to other machines. In a networked deployment, the machine 5000 may operate in the capacity of a server machine, a client machine, or both in server-client network environments. In an example, the machine 5000 may act as a peer machine in peer-to-peer (P2P) (or other distributed) network environment. The machine 5000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 5000 may include a hardware processor 5002 (e.g., a central processing unit (CPU), a graphics processing unit (GPU), a hardware processor core, or any combination thereof), a main memory 5004 and a static memory 5006, some or all of which may communicate with each other via an interlink (e.g., bus) 5008. The machine 5000 may further include a display unit 5010, an alphanumeric input device 5012 (e.g., a keyboard), and a user interface (UI) navigation device 5014 (e.g., a mouse). In an example, the display unit 5010, input device 5012 and UI navigation device 5014 may be a touch screen display. The machine 5000 may additionally include a storage device (e.g., drive unit) 5016, a signal generation device 5018 (e.g., a speaker or transducer), a network interface device 5020, and one or more sensors 5021, such as a global positioning system (GPS) sensor, compass, accelerometer, or other sensor. The machine 5000 may include an output controller 5028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 5016 may include a machine readable medium 5022 on which is stored one or more sets of data structures or instructions 5024 (e.g., software) embodying or utilized by any one or more of the techniques or functions described herein. The instructions 5024 may also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 may constitute machine readable media.

While the machine readable medium 5022 is illustrated as a single medium, the term "machine readable medium" may include a single medium or multiple media (e.g., a centralized or distributed database, and/or associated caches and servers) configured to store the one or more instructions 5024.

The term "machine readable medium" may include any medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 5024 may further be transmitted or received over a communications network 5026 using a transmission medium via the network interface device 5020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Bluetooth family of standards, peer-to-peer (P2P) networks, among others. In an example, the network interface device 5020 may include one or more physical jacks (e.g., Ethernet, coaxial, or phone jacks) or one or more antennas to connect to the communications network 5026. In an example, the network interface device 5020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 5000, and includes digital or analog communications signals or other intangible medium to facilitate communication of such software.

Machine may also include one or more microphones 5046 and may contain processing logic to process the sounds detected through microphones 5046. For example, the processing may be to assist a hearing impaired individual to hear sounds in the environment. These processed sounds may then be output through the signal generation device 5018.

Various embodiments of the present subject matter support wireless communications with a hearing assistance device. In various embodiments the wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

It is understood that variations in communications protocols, antenna configurations, and combinations of components may be employed without departing from the scope of the present subject matter. Hearing assistance devices typically include an enclosure or housing, a microphone, hearing assistance device electronics including processing electronics, and a speaker or receiver. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that any hearing assistance device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the wearer.

It is understood that the hearing aids referenced in this patent application include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

EXAMPLES

Example 1 includes subject matter (such as a method, means for performing acts, machine readable medium including instructions that, when performed by a machine cause the machine to perform acts, or an apparatus configured to perform): requesting from a firmware update service, over a network, a latest firmware version number of a firmware of a hearing assistance device; receiving the firmware version number from the firmware update service; determining that a firmware version of a firmware object stored in local storage is older than the firmware version number received from the firmware update service; requesting from the firmware update service an updated firmware object with the received firmware version number, the updated firmware object providing software instructions for performing operations on a hearing assistance device; and storing the received updated firmware object in a location in local storage that does not require elevated user access permissions.

In example 2, the subject matter of example 1 may optionally include registering with the firmware update service, and wherein the operation of requesting from the firmware update service, over the network, the latest firmware version number is responsive to receiving an update notification from the firmware update service.

In example 3, the subject matter of any one or more of examples 1-2 may optionally include: determining a plurality of hearing assistance devices that have firmware whose version number is less than the firmware version number received from the firmware update service; and automatically contacting owners of the plurality of hearing assistance devices that have firmware whose version number is less than the firmware version number received from the firmware update service.

In example 4, the subject matter of any one or more of examples 1-3 may optionally include automatically contacting comprises emailing the owners.

In example 5, the subject matter of any one or more of examples 1-4 may optionally include wherein automatically contacting comprises phoning the owners and playing an automated message.

In example 6, the subject matter of any one or more of examples 1-5 may optionally include providing a Wi-Fi access point.

In example 7, the subject matter of any one or more of examples 1-6 may optionally include wherein the method is performed by a service of the operating system.

In example 8, the subject matter of any one or more of examples 1-7 may optionally include wherein no user intervention is required to perform the method.

Example 9 includes or may optionally be combined with the subject matter of any one or more of examples 1-8 to include subject matter (such as a device, apparatus, system, or machine) comprising one or more computer processors configured to include: a firmware update module configured to: request from a firmware update service, over a network, a latest firmware version number of a firmware of a hearing assistance device; receive the firmware version number from the firmware update service; determine that a firmware version of a firmware object stored in local storage is older than the firmware version number received from the firmware update service; request from the firmware update service an updated firmware object with the received firmware version number, the updated firmware object providing software instructions for performing operations on a hearing assistance device; and store the received updated firmware object in a location in local storage that does not require elevated user access permissions.

In example 10, the subject matter of any one or more of examples 1-9 may optionally include wherein the firmware update module is configured to register with the firmware update service, and wherein the firmware update module is configured to request the latest firmware version number responsive to the receipt of an update notification from the firmware update service.

In example 11, the subject matter of any one or more of examples 1-10 may optionally include wherein the firmware update module is configured to: determine a plurality of hearing assistance devices that have firmware whose version number is older than the firmware version number received from the firmware update service; and automatically contact owners of the plurality of hearing assistance devices that have firmware whose version number is less than the firmware version number received from the firmware update service.

In example 12, the subject matter of any one or more of examples 1-11 may optionally include wherein the firmware update module is configured to contact owners by emailing the owners.

In example 13, the subject matter of any one or more of examples 1-12 may optionally include wherein the firmware update module is configured to contact owners by phoning the owners and playing an automated message.

In example 14, the subject matter of any one or more of examples 1-13 may optionally include wherein the one or more computer processors are configured to provide a Wi-Fi access point.

In example 15, the subject matter of any one or more of examples 1-14 may optionally include, wherein the firmware update module is a service of an operating system.

In example 16, the subject matter of any one or more of examples 1-15 may optionally include wherein the firmware update module is configured to perform the operations without user intervention.

What is claimed is:

1. A method comprising:
executing a firmware update process on a computing device using a computer processor, the computing device executing an operating system wherein the operating system requires elevated access privileges to install applications, the firmware update process:
requesting from a firmware update service, over a network, a latest firmware version number of a firmware of a hearing assistance device;
receiving the latest firmware version number from the firmware update service;
determining that a firmware version of a firmware object stored in a file-system location in non-volatile local storage is older than the latest firmware version number;
requesting from the firmware update service an updated firmware object with the latest firmware version number, the updated firmware object providing instructions for performing operations on a hearing assistance device;
storing the updated firmware object in the file-system location in non-volatile local storage of the computing device, the file-system location not requiring the firmware update process to obtain elevated user access permissions from the operating system; and
subsequent to storing the updated firmware object:
establishing a connection with a hearing assistance device; and
determining that the hearing assistance device has a firmware version that is an older version than the latest firmware version number, and in response, updating a firmware of the hearing assistance device with the updated firmware object.

2. The method of claim 1, comprising registering with the firmware update service, and wherein the operation of requesting from the firmware update service, over the network, the latest firmware version number is responsive to receiving an update notification from the firmware update service.

3. The method of claim 2, comprising:
determining a plurality of hearing assistance devices that have firmware whose version number is less than the firmware version number received from the firmware update service; and
automatically contacting owners of the plurality of hearing assistance devices that have firmware whose version number is less than the firmware version number received from the firmware update service.

4. The method of claim 3, wherein automatically contacting comprises emailing the owners.

5. The method of claim 3, wherein automatically contacting comprises phoning the owners and playing an automated message.

6. The method of claim 1, comprising: providing a Wi-Fi access point.

7. The method of claim 1, wherein the method is performed by a service of the operating system.

8. The method of claim 1, wherein no user intervention is required to perform the method.

9. A system comprising:
one or more computer processors;
a computer readable medium that stores instructions for a firmware update process, the instructions, which when performed by the one or more computer processors, cause the system to perform operations of:
requesting from a firmware update service, over a network, a latest firmware version number of a firmware of a hearing assistance device;
receiving the latest firmware version number from the firmware update service;
determining that a firmware version of a firmware object stored in a file-system location in non-volatile local storage of the system is older than the latest firmware version number;
requesting from the firmware update service an updated firmware object with the latest firmware version number, the firmware object providing instructions for performing operations on a hearing assistance device;
storing the updated firmware object in a file-system location in non-volatile local storage, the file-system location not requiring the firmware update process to obtain elevated user access permissions from an operating system executed by the one or more computer processors; and
subsequent to storing the updated firmware object:
establishing a connection with a hearing assistance device; and
determining that the hearing assistance device has a firmware version that is an older version than the latest firmware version number, and in response, updating a firmware of the hearing assistance device with the updated firmware object.

10. The system of claim 9, wherein the operations comprise registering with the firmware update service, and wherein the operations of requesting from the firmware update service, over the network, the latest firmware version number comprises requesting the latest firmware version number responsive to the receipt of an update notification from the firmware update service.

11. The system of claim 10, wherein the operations comprise:
determining a plurality of hearing assistance devices that have firmware whose version number is older than the firmware version number received from the firmware update service; and
automatically contacting owners of the plurality of hearing assistance devices that have firmware whose version number is less than the firmware version number received from the firmware update service.

12. The system of claim 11, wherein the operations comprise contacting owners by emailing the owners.

13. The system of claim 11, wherein the operations comprise contacting owners by phoning the owners and playing an automated message.

14. The system of claim 9, wherein the one or more computer processors are configured to provide a Wi-Fi access point.

15. The system of claim 9, wherein the firmware update process is a service of an operating system.

16. The system of claim 9, wherein the firmware update process is configured to perform the operations without user intervention.

17. A non-transitory machine readable medium that stores instructions for a firmware update process, which when performed by a machine, cause the machine to perform operations comprising:
- requesting from a firmware update service, over a network, a latest firmware version number of a firmware of a hearing assistance device;
- receiving the latest firmware version number from the firmware update service;
- determining that a firmware version of a firmware object stored in a file-system location in non-volatile local storage is older than the latest firmware version number;
- requesting from the firmware update service an updated firmware object with the latest firmware version number, the firmware object providing instructions for performing operations on a hearing assistance device;
- storing the updated firmware object in the file-system location in non-volatile local storage of the machine, the file-system location not requiring the firmware update process to obtain elevated user access permissions from an operating system executed by the machine; and
- subsequent to storing the updated firmware object:
  - establishing a connection with a hearing assistance device; and
    - determining that the hearing assistance device has a firmware version that is an older version than the latest firmware version number, and in response, updating a firmware of the hearing assistance device with the updated firmware object.

18. The machine readable medium of claim 17, wherein the instructions comprise instructions, which when performed by the machine cause the machine to perform the operations of registering with the firmware update service, and wherein the operation of requesting from the firmware update service, over the network, the latest firmware version number is performed responsive to receiving an update notification from the firmware update service.

19. The machine readable medium of claim 18, wherein the instructions comprise instructions, which when performed by the machine cause the machine to perform the operations of:
- determining a plurality of hearing assistance devices that have firmware whose version number is older than the firmware version number received from the firmware update service; and
- automatically contacting owners of the plurality of hearing assistance devices that have firmware whose version number is less than the firmware version number received from the firmware update service.

20. The machine readable medium of claim 19, wherein automatically contacting comprises emailing the owners.

21. The machine readable medium of claim 19, wherein automatically contacting comprises phoning the owners and playing an automated message.

22. The machine readable medium of claim 17, wherein the instructions comprise instructions, which when performed by the machine cause the machine to perform the operations of providing a Wi-Fi access point.

23. The machine readable medium of claim 17, wherein the operations are performed by a service of an operating system.

24. The machine readable medium of claim 17, wherein no user intervention is required to perform the method.

\* \* \* \* \*